United States Patent
Kang

(10) Patent No.: US 11,908,326 B2
(45) Date of Patent: Feb. 20, 2024

(54) VEHICLE ALERT SYSTEM AND METHOD

(71) Applicant: HYUNDAI MOBIS CO., LTD., Seoul (KR)

(72) Inventor: Eun Seok Kang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/891,041

(22) Filed: Aug. 18, 2022

(65) Prior Publication Data

US 2023/0118523 A1 Apr. 20, 2023

(30) Foreign Application Priority Data

Oct. 19, 2021 (KR) .................. 10-2021-0139450

(51) Int. Cl.
*G08G 1/16* (2006.01)
*B60Q 9/00* (2006.01)

(52) U.S. Cl.
CPC .............. *G08G 1/16* (2013.01); *B60Q 9/008* (2013.01)

(58) Field of Classification Search
CPC .......... G08G 1/16; G08G 1/166; G08G 1/167; B60Q 9/00; B60Q 9/008; B60W 30/095; B60W 30/10; B60W 30/11; B60W 30/16; B60W 30/165; B60W 50/02; B60W 50/0205; B60W 50/0225; B60W 50/06
See application file for complete search history.

(56) References Cited

U.S. PATENT DOCUMENTS

| | | | |
|---|---|---|---|
| 2008/0231496 A1* | 9/2008 | Sakamoto | G01S 7/354 342/159 |
| 2014/0297171 A1* | 10/2014 | Minemura | B60R 21/34 342/70 |
| 2016/0107644 A1* | 4/2016 | Eigel | B62D 15/0265 701/70 |
| 2021/0356580 A1* | 11/2021 | Song | G01S 13/931 |
| 2021/0394760 A1* | 12/2021 | Mielenz | B60W 30/18154 |

FOREIGN PATENT DOCUMENTS

KR 10-2019-0047292 A 5/2019

OTHER PUBLICATIONS

NPL Search.*

* cited by examiner

*Primary Examiner* — Van T Trieu
(74) *Attorney, Agent, or Firm* — NSIP Law

(57) ABSTRACT

A vehicle alert system includes a detection sensor configured to detect a target vehicle approaching a subject vehicle, a storage configured to store a false alert condition comprising a position or lateral error of the target vehicle with respect to the subject vehicle, and an alert determiner configured to output an alert signal when the target vehicle is detected by the detection sensor and no sensing blockage occurs, and not output the alert signal when the sensing blockage occurs and the detected target vehicle satisfies the false alert condition.

16 Claims, 6 Drawing Sheets

VEHICLE ALERT SYSTEM AND METHOD

CROSS REFERENCE TO RELATED APPLICATION

The application claims the benefit under 35 USC 119(a) of Korean Patent Application No. 10-2021-0139450, filed Oct. 19, 2021, in the Korean Intellectual Property Office, the entire disclosure of which is incorporated by reference for all purposes.

BACKGROUND OF THE DISCLOSURE

Field of the Disclosure

The present disclosure relates to a vehicle alert system and method.

Description of the Related Art

Rear Cross-Traffic Alert (RCTA) is a system that provides an alert sound when there is an invisible vehicle in the blind spot of the side mirror of a subject vehicle.

Conventionally, with the blockage of the detection range of a sensor of the RCTA of a subject vehicle due to a surrounding vehicle parked on the left side of the subject vehicle, it may be difficult to detect a target vehicle approaching the subject vehicle. In this case, there may be a problem that a situation in which when there is such an approaching target vehicle, an alert condition is instantaneously satisfied so that a false alert signal is generated arises. In this case, even though there is no need to warn a driver to be careful in advance, when an alert condition is instantaneously satisfied due to the target vehicle approaching the subject vehicle while changing the traveling lane, the conventional RCTA may warn the driver to be careful, which may distract the driver's attention, and cause the situation that an alert cannot be provided due to a false alert.

Therefore, as a way to improve a false warning situation that occurs due to lateral information including lateral distance error and lateral speed error in the RCTA, a method in which a false alert is not generated on purpose or an alert is delayed even in a false alert condition is required.

The foregoing is intended merely to aid in the understanding of the background of the present disclosure, and is not intended to mean that the present disclosure falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a vehicle alert system includes a detection sensor configured to detect a to target vehicle approaching a subject vehicle, a storage configured to store a false alert condition comprising a position or lateral error of the target vehicle with respect to the subject vehicle, and an alert determiner configured to output an alert signal when the target vehicle is detected by the detection sensor and no sensing blockage occurs, and not output the alert signal when the sensing blockage occurs and the detected target vehicle satisfies the false alert condition.

The detection sensor may be further configured to detect the target vehicle through an ultrasonic wave, a camera, a lidar, or a radar.

The detection sensor may be further configured to detect the target vehicle based on a reference position angle of the radar.

The detection sensor may be disposed in front or rear of the subject vehicle to detect the target vehicle.

The false alert condition may include the position of the target vehicle including horizontal and vertical distances between the subject vehicle and the target vehicle, or the lateral error of the target vehicle including a lateral distance error, a lateral speed error, and a horizontal time error with respect to the subject vehicle.

In a state in which the sensing blockage occurs and the target vehicle is approaching the subject vehicle, when the lateral distance error of the target vehicle is less than or equal to a threshold value thereof, and the target vehicle's lateral speed error and time error are greater than or equal to threshold values thereof, the alert determiner may be further configured to determine the false alert condition to be satisfied and do not output the alert signal.

The alert determiner may be further configured to output the alert signal when the lateral distance error of the target vehicle exceeds the threshold value.

The alert determiner may be further configured to output the alert signal when the lateral speed error of the target vehicle and lateral time error with respect to the subject vehicle are less than the threshold values.

In another general aspect, a vehicle alert method includes detecting a target vehicle approaching a subject vehicle, storing a false alert condition comprising a position of the target vehicle or a lateral error of the target vehicle with respect to the subject vehicle, and outputting an alert signal when the target vehicle is detected and no sensing blockage occurs, and outputting no alert signal to when the sensing blockage occurs and the detected target vehicle satisfies the false alert condition.

The false alert condition may include the position of the target vehicle including horizontal and vertical distances between the subject vehicle and the target vehicle, or the lateral error of the target vehicle including a lateral distance error, a lateral speed error, and a horizontal time error with respect to the subject vehicle.

In a state in which the sensing blockage occurs and the target vehicle is approaching the subject vehicle, when the lateral distance error of the target vehicle is less than or equal to a threshold value thereof, and the target vehicle's lateral speed error and time error are greater than or equal to threshold values thereof, the false alert condition may be determined to be satisfied and the alert signal is not output.

The alert signal may be output when the lateral distance error of the target vehicle exceeds the threshold value.

The alert signal may be output when the target vehicle's lateral speed error and lateral time error with respect to the subject vehicle are less than the threshold values.

In another general aspect, a vehicle alert system includes a detection sensor configured to detect a target vehicle approaching a subject vehicle, a storage configured to store a false alert condition comprising a position or lateral error of the target vehicle with respect to the subject vehicle; and an alert determiner configured to output an alert signal based on a result of a determination of whether the target vehicle is detected and a sensing blockage occurs.

The alert signal may be output when the target vehicle is detected and the sensing blockage did not occur.

The alert signal may not output when the sensing blockage occurs and the detected target vehicle satisfies the false alert condition.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION OF THE DISCLOSURE

Figure 1:
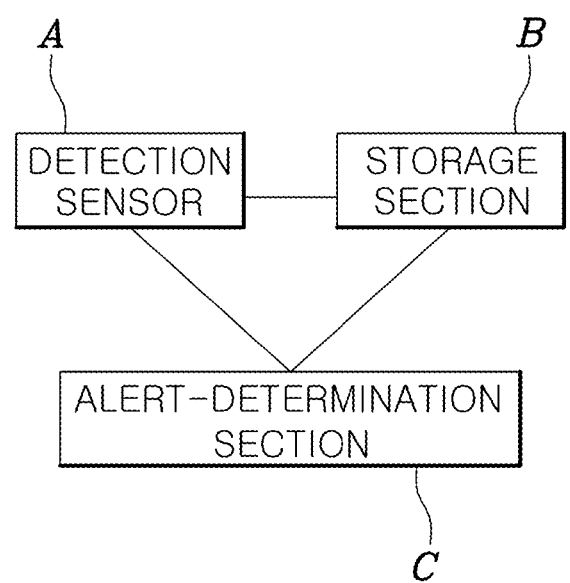
FIG. 1 is a block diagram illustrating a vehicle alert system according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, to apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the to presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, the meaning of all terms including technical and scientific terms used herein is the same as that commonly understood by one of ordinary skill in the art to which the present disclosure belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Hereinafter, embodiments disclosed in the present specification will be described in detail with reference to the accompanying drawings, wherein the same or similar components are assigned the same reference numbers.

An objective of the present disclosure is to provide a vehicle alert system and method in which upon the occurrence of the blockage due to a neighboring parked vehicle at the lateral sides of a subject vehicle, when a false alert condition is satisfied, a sensor of rear cross-traffic alert (ROTA) does not output an alert signal to warn a vehicle driver of a target vehicle approaching the subject vehicle so as to prevent the ROTA sensor from outputting a false alert signal due to the blockage, thereby eliminating the false alert problem of the vehicle's ROTA for a target vehicle having a lateral error due to the blockage.

Figure 2:
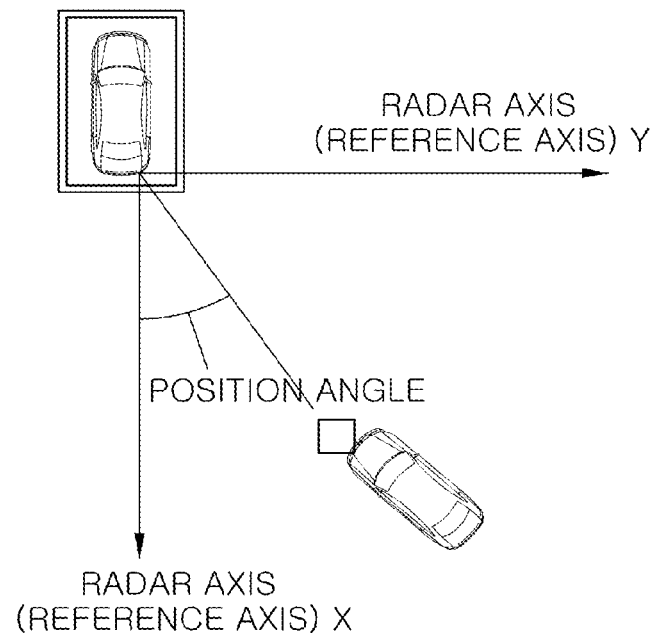
FIG. 2 is a diagram illustrating a target vehicle's approach angle to a subject vehicle and a subject vehicle's position angle with respect to a target vehicle's initial position.
Figure 2:
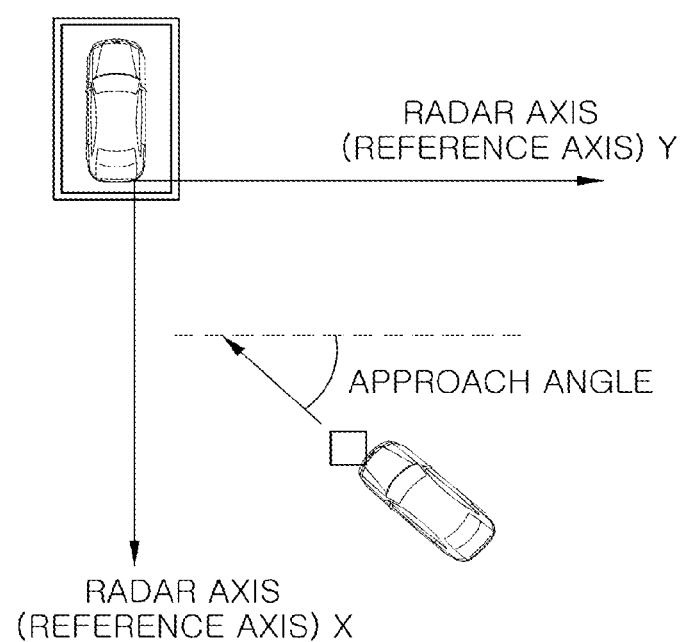
Figure 3:
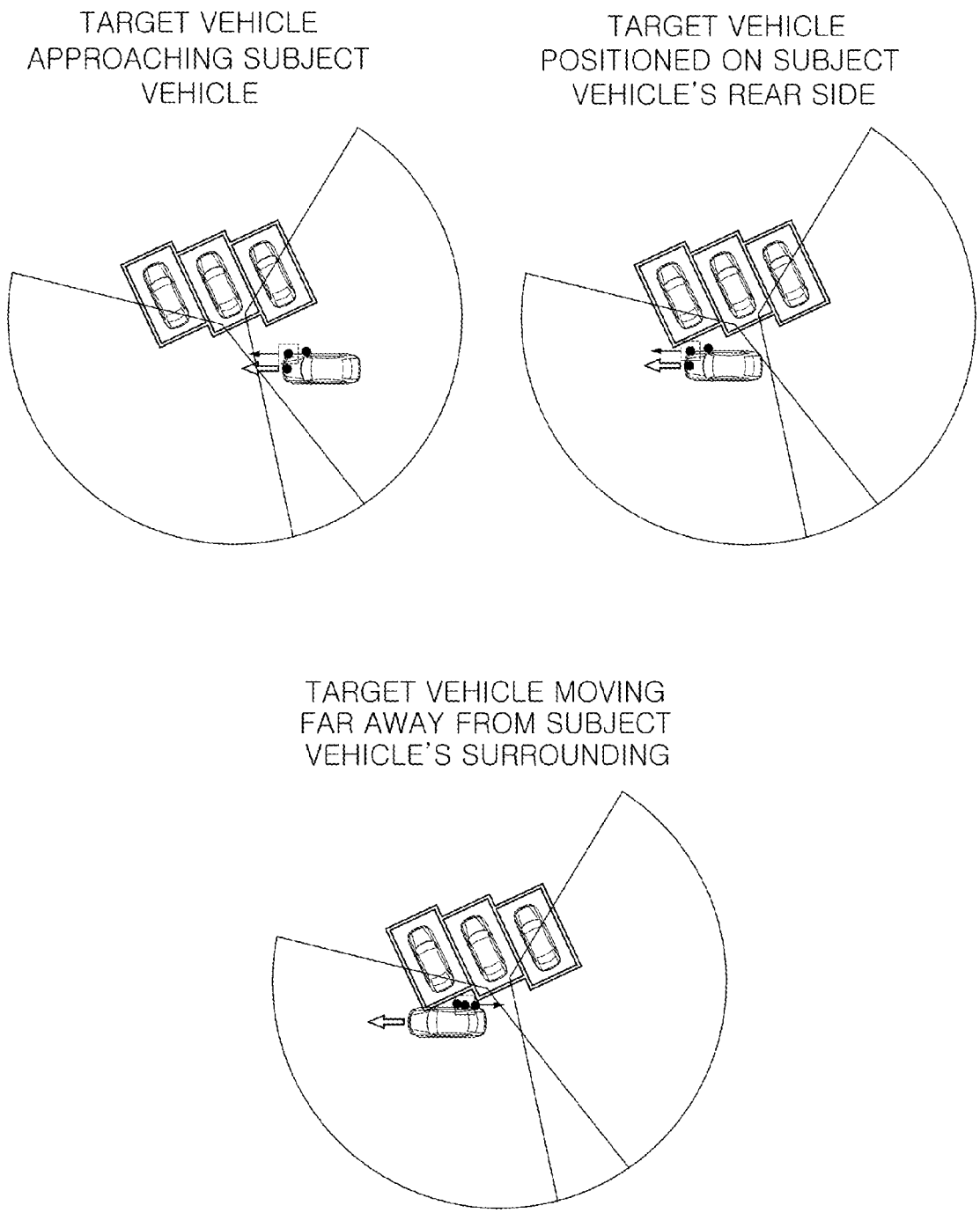
FIG. 3 is a diagram illustrating subject vehicle's situations according to the target vehicle's positions with a vehicle parked on the left side of the subject vehicle.
Figure 4:
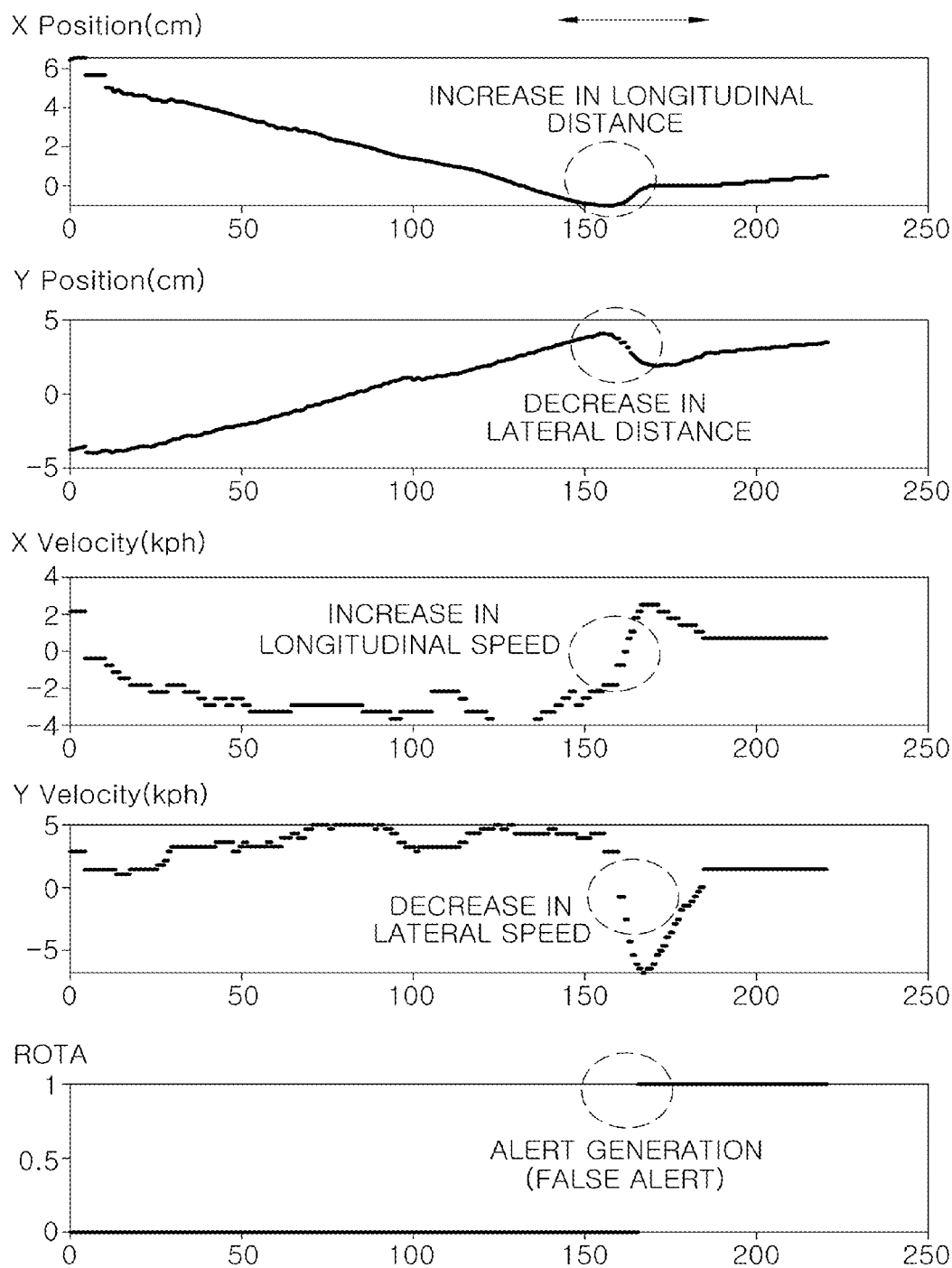
FIG. 4 is a diagram illustrating the situation of a false alert condition occurring according to target vehicle's longitudinal and lateral distances and speeds with respect to the subject vehicle in respective situations illustrated in FIG. 3.
Figure 5:
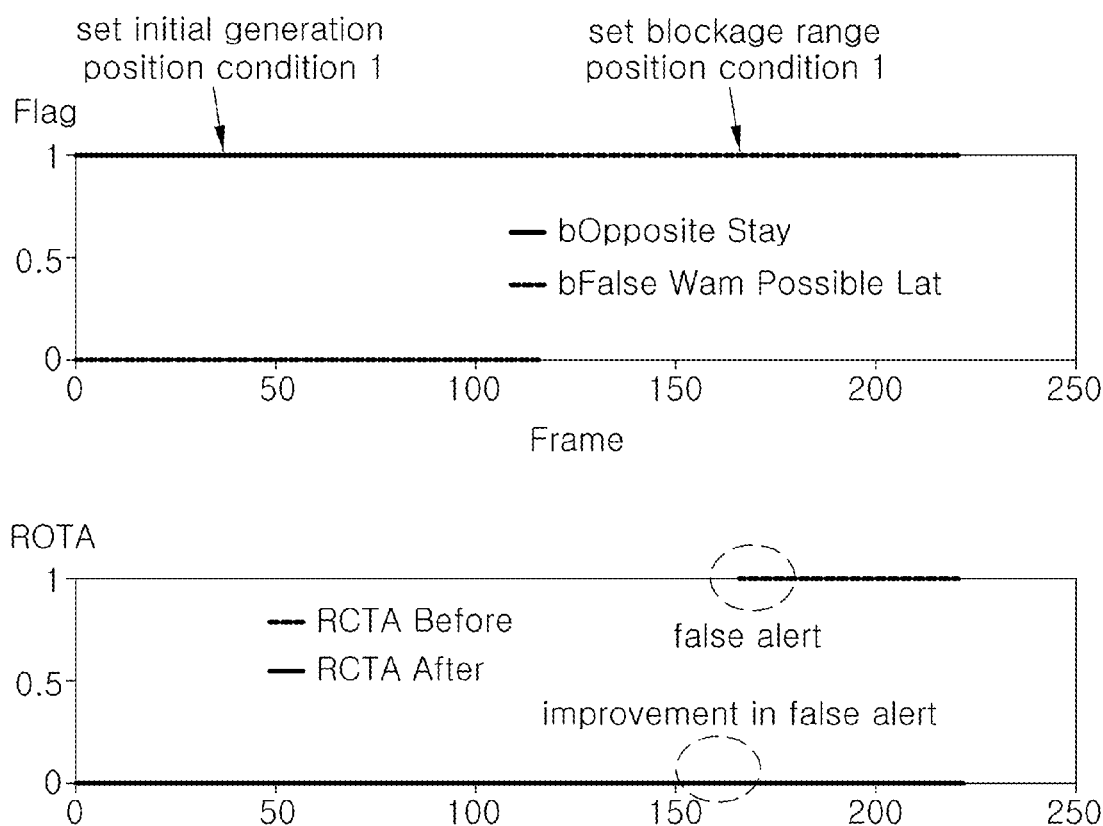
FIG. 5 is a diagram illustrating an improvement in a false alert situation with the configuration in which an alert signal is not output even when the target vehicle satisfies a false alert condition stored in a storage section.
Figure 6:
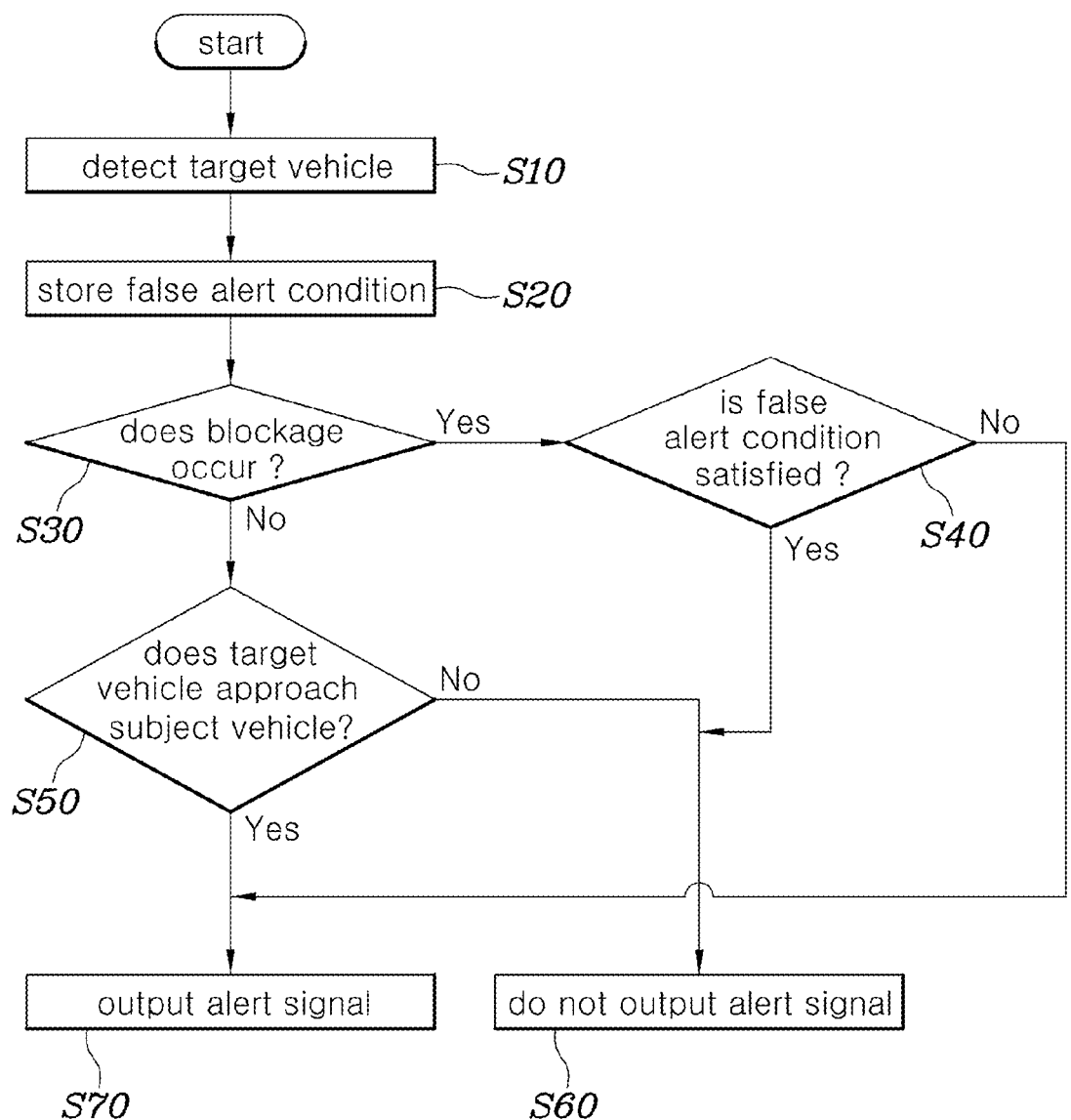
FIG. 6 is a flowchart illustrating an operation of the vehicle alert of the vehicle of FIG. 1.

FIG. 1 is a block diagram illustrating a vehicle alert system according to an embodiment of the present disclosure. FIG. 2 is a diagram illustrating a target vehicle's approach angle to a subject vehicle and a subject vehicle's position angle with respect to a target vehicle's initial position. FIG. 3 is a diagram illustrating subject vehicle's situations according to the target vehicle's positions with a vehicle parked on the left side of the subject vehicle. FIG. 4 is a diagram illustrating the situation of a false alert condition occurring according to target vehicle's longitudinal and lateral distances and speeds with respect to the subject vehicle in respective situations illustrated in FIG. 3. FIG. 5 is a diagram illustrating an improvement in a false alert situation with the configuration in which an alert signal is not output even when the target vehicle satisfies a false alert condition stored in a storage section. FIG. 6 is a flowchart illustrating an operation of the vehicle alert of the vehicle of FIG. 1.

FIG. 1 is a block diagram illustrating a vehicle alert system according to an embodiment of the present disclosure.

Referring to FIG. 1, the vehicle alert system includes:
a detection sensor A detecting a target vehicle approaching a subject vehicle;
a storage section B storing a false alert condition including a target vehicle's position or a target vehicle's lateral error with respect to the subject vehicle; and
an alert-determination section (alert determiner) C configured to output an alert signal when the target vehicle approaching the subject vehicle is detected by the detection sensor A, and no sensing blockage occurs, and not to output an alert signal when the sensing blockage occurs and the detected target vehicle satisfies the false alert condition stored in the storage section B.

The present disclosure is characterized in that a sensor of a subject vehicle's rear cross-traffic alert (ROTA) system is prevented from outputting a false alert signal even when detecting a target vehicle approaching the subject vehicle. To this end, it is necessary to create a situation in which the ROTA does not output an alert signal or delays the alert signal when a false alert condition is satisfied.

The ROTA system means a system that generates an alert sound when an invisible vehicle is detected in the blind spot of a subject vehicle's side mirror. In general, when a target vehicle changes its traveling lane, a difference between the actual target information and the tracking information occurs due to a tracking filter of a radar, so that the time required for the ROTA system to satisfy the alert condition is increased. Therefore, the ROTA system frequently determines that the alert condition has been satisfied and outputs an alert signal.

Generally, in an ROTA system, a 79 GHz radar for detecting a target vehicle approaching a subject vehicle has a high probability of detecting objects around the subject vehicle because of its high resolution. In addition, the ROTA system using forward radar detection information as well as rear cross-traffic radar information can detect surrounding objects. The ROTA system that uses information from the 79 GHz radar and the rear cross traffic radar, which detect a target vehicle, as well as forward radar detection information sensitively detects surrounding objects approaching a subject vehicle. At this time, when a vehicle is parked on the left side of the subject vehicle, a sensing area by the detection sensor A is blocked by the parked vehicle. Since the ROTA system cannot accurately determine the position of an approaching target vehicle when the sensing area is blocked, there may be a situation in which an alert signal is generated even though the alert signal is not required or a situation in which an alert signal is not generated even though the alert signal is required. In this case, even though there is no need to warn a driver to be careful in advance, when an alert condition is instantaneously satisfied due to the target vehicle approaching the subject vehicle while changing the traveling lane, the conventional ROTA system may warn the driver to be careful, which may distract the driver's attention and cause a dangerous situation for the subject vehicle's driver.

Therefore, according to the present disclosure, the alert-determination section C of the vehicle alert system is configured to output an alert signal when a target vehicle approaching a subject vehicle is detected by the detection sensor and the sensing blockage due to an adjoining parked vehicle does not occur, and not to output an alert signal when the sensing blockage occurs and the detected target vehicle satisfies the false alert condition stored in the storage section B.

Specifically, the detection sensor A can detect the target vehicle approaching the subject vehicle. In order to detect the target vehicle approaching the subject vehicle, the detection sensor can detect the target vehicle through ultrasonic waves, a camera, a lidar, and a radar. In general, the ROTA system can detect the target vehicle through detection information from a 79 GHz radar, a rear cross traffic radar, and a forward radar. Then, the alert-determination section C can output an alert signal for the approaching target vehicle through the detection information from the 79 GHz radar and the rear cross traffic radar, which constitute the detection sensor A of the ROTA system, and the forward radar.

FIG. 2 is a diagram illustrating a target vehicle's approach angle to a subject vehicle and a subject vehicle's position angle with respect to a target vehicle's initial position, and FIG. 3 is a diagram illustrating subject vehicle's situations according to the target vehicle's positions with a vehicle parked on the left side of the subject vehicle.

Referring to FIGS. 2 and 3, the detection sensor A may be disposed on the front or rear side of a subject vehicle to detect a target vehicle approaching the subject vehicle on the basis of a reference position angle of a radar.

The target vehicle's approach angle to the subject vehicle means a subject vehicle's angle with the front side of the target vehicle approaching the subject vehicle along y-axis of the detection sensor A, which may be a radar, of the subject vehicle. The position angle, which is a subject vehicle's angle with respect to the target vehicle's initial position, refers to an angle with the front side of the target vehicle approaching the subject vehicle along an x-axis of the radar. The detection sensor A may perform the detection operation on the basis of the position angle, which is an angle with respect to the front side of the target vehicle approaching the subject vehicle, in a situation in which the target vehicle satisfies the approach angle. In addition, the detection sensor A may be disposed at any position so long as it can detect a target vehicle, and is generally disposed on the front or rear side of a subject vehicle. For example, the detection sensor A disposed at the rear side can detect a certain angle range of not only the rear side, but also the lateral side of the subject vehicle within a possible detection range of the detection sensor A. Further, the detection sensor A disposed at the front side can detect a certain angle range of not only the front side, but also the lateral side of the subject vehicle within the possible detection range of the detection sensor A. This increases the detection accuracy particularly for the lateral sides of the subject vehicle, because the lateral sides are detected by double sensing.

In addition, the storage section B stores a false alert condition consisting of a target vehicle's position or a target vehicle's lateral error with respect to a subject vehicle. Whether to satisfy the false alert condition stored in the ROTA system is determined after an alert condition is first satisfied. The alert condition is determined by wholly determining whether a target vehicle is within an alert range, whether the target vehicle's estimated time to collision (TTC) with a subject vehicle is less than or equal to a set value, whether a target vehicle's estimated collision point with a subject vehicle is within a set range, and whether a target vehicle's approach angle to a subject vehicle is within a set range.

In addition, the storage section B stores a false alert condition including a target vehicle's position including horizontal and vertical distances between a subject vehicle and a target vehicle, or a target vehicle's lateral error including a lateral distance error, a lateral speed error, and a horizontal time error with respect to the subject vehicle. Referring to FIG. 3, there may be a case in which the target vehicle approaches the vehicle or the target vehicle is located at the rear of the subject vehicle. At this time, referring to FIG. 4, it can be seen that the target vehicle's distance with respect to the subject vehicle decreases in the longitudinal direction and increases in the lateral direction, and that the target vehicle's speed with respect to the subject vehicle is maintained in both longitudinal and lateral directions. Therefore, in this case, it is possible to detect the front side, mainly the right front side, of the target vehicle, so that tracking data is generated and maintained.

However, when the sensing blockage occurs due to a surrounding vehicle parked on the left side of a subject vehicle, there may be a situation in which the detection of the target vehicle by the detection sensor A becomes inaccurate due to the parked vehicle, that is, the front side and the right front side of the target vehicle are not detected. At this time, the right side and the right rear side of the target vehicle are detected and the detection sensor's tracking information on the target vehicle is updated based on the detection information. Further, it can be seen from FIG. 4 that the target vehicle's lateral error with respect to the subject vehicle, including the lateral distance error, the lateral speed error, and the lateral time error, occurs. Therefore, the storage section B stores the false alert condition composed of the target vehicle's position including horizontal and vertical distances between the subject vehicle and the target vehicle, and the target vehicle's lateral error including a lateral distance error, a lateral speed error, and a horizontal time error with respect to the subject vehicle, in order for the alert-determination section C to prevent the false alert situation according to the lateral error.

FIG. 4 is a diagram illustrating the situation of a false alert condition occurring according to target vehicle's longitudinal and lateral distances and speeds with respect to the subject vehicle in respective situations illustrated in FIG. 3.

FIG. 5 is a diagram illustrating an improvement in a false alert situation with the configuration in which an alert signal is not output even when the target vehicle satisfies a false alert condition stored in a storage section.

The alert-determination section C may be configured to output an alert signal when the target vehicle approaching the subject vehicle is detected by the detection sensor A, and no sensing blockage occurs, and not to output an alert signal when the sensing blockage occurs and the detected target vehicle satisfies the false alert condition stored in the storage section B. Here, particularly, in a state in which the sensing blockage occurs and the target vehicle is approaching the subject vehicle, when the target vehicle's lateral distance error is less than or equal to a threshold value thereof, and the target vehicle's lateral speed error and time error are greater than or equal to threshold values thereof, the alert-determination section C may determine the false alert condition to be satisfied and not output an alert signal.

The alert-determination section C first determines the tracking data for the target vehicle, and determines whether the target vehicle approaches the subject vehicle from the opposite direction of the vehicle parked on the left side of the subject vehicle. It may be characterized in that the alert-determination section outputs an alert signal when the target vehicle's lateral distance error exceeds the threshold value. In regard of the target vehicle's lateral distance error with respect to the subject vehicle, in the case where the target vehicle is sufficiently far from the subject vehicle, even when the alert-determination section C determines that the target vehicle is approaching from the opposite direction of the vehicle parked on the left side of the subject vehicle, the target vehicle is located far from the subject vehicle, so the false alert condition is not satisfied because it is determined that a false alert due to an error will not occur. Therefore, when the alert condition is satisfied and the false alert condition is not satisfied, the alert-determination section C may output an alert signal to warn the subject vehicle's driver. For example, this is because when the target vehicle approaches the subject vehicle by making a U-turn, it is difficult to determine that the target vehicle is approaching from the opposite direction of the vehicle parked on the left side of the subject vehicle.

In addition, it may be characterized in that the alert-determination section C outputs an alert signal when the target vehicle's lateral speed error and lateral time error with respect to the subject vehicle are less than the threshold values. When the alert-determination section C determines that the target vehicle is approaching from the opposite direction of the vehicle parked on the left side of the subject vehicle, and the target vehicle travels the lane while driving forward and then backward, the lateral speed is maintained at 0 for a certain period of time when determining tracking data for the target vehicle. At this time, assuming that the target vehicle's lateral time error for a certain period of time is set as a threshold value, and it is determined whether the target vehicle's lateral speed error is within the threshold value below the lateral time error threshold value. When the target vehicle's lateral speed and time errors with respect to the subject vehicle are less than the threshold values, an alert signal is output because it is difficult to determine that the target vehicle is approaching from the opposite direction of the vehicle parked on the left side of the subject vehicle.

FIG. 6 is a flowchart illustrating an operation of the vehicle alert of the vehicle of FIG. 1.

The vehicle alert method includes:
detecting a target vehicle approaching to a subject vehicle (S10);

storing a false alert condition including a target vehicle's position or a target vehicle's lateral error with respect to the subject vehicle (S20); and outputting an alert signal when the target vehicle approaching to the subject vehicle is detected and no sensing blockage occurs (S70), and outputting no alert signal when the sensing blockage occurs and the detected target vehicle satisfies the false alert condition (S60).

Detailed technical characteristics in each step of the vehicle alert method according to the present disclosure are the same as or similar to the technical characteristics of each configuration in the vehicle alert system according to the present disclosure described above, and thus a detailed description thereof will be omitted.

In step S20 of storing the false alert condition, the false alert condition may include the target vehicle's position including horizontal and vertical distances between the subject vehicle and the target vehicle, or the target vehicle's lateral error including a lateral distance error, a lateral speed error, and a horizontal time error with respect to the subject vehicle.

After the step S20 of storing the false alert condition, the method may further include a step S30 of determining whether the sensing blockage of the target vehicle has occurred.

The method may further include a step S40 of determining whether the stored false alert condition is satisfied when it is determined that the sensing blockage has occurred in the step S30 of determining whether the sensing blockage that blocks the target vehicle has occurred.

The method may further include a step S50 of determining whether the target vehicle approaches the subject vehicle when it is determined that the sensing blockage does not occur in the step S30 of determining whether the sensing blockage of the target vehicle has occurred.

In the step S70, in a state in which the sensing blockage occurs and the target vehicle is approaching the subject vehicle, when the target vehicle's lateral distance error is less than or equal to a threshold value thereof, and the target vehicle's lateral speed error and time error are greater than or equal to threshold values thereof, the false alert condition may be determined to be satisfied and the alert signal may not be output.

The alert signal may be output when the target vehicle's lateral distance error exceeds the threshold value.

The alert signal may be output when the target vehicle's lateral speed error and lateral time error with respect to the subject vehicle are less than the threshold values.

According to the vehicle alert system and method, when the false alert condition is satisfied, the sensor of rear cross-traffic alert (ROTA) does not output an alert signal to warn a vehicle driver of a target vehicle approaching the subject vehicle so as to prevent the ROTA sensor from outputting the false alert signal due to the sensing blockage, thereby eliminating the false alert problem of the vehicle's ROTA for a target vehicle having a lateral error due to the sensing blockage.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle alert system comprising:
a detection sensor configured to detect a target vehicle approaching a subject vehicle;
a storage configured to store a false alert condition comprising a position or lateral error of the target vehicle with respect to the subject vehicle; and
an alert determiner configured to output an alert signal when the target vehicle is detected by the detection sensor and no sensing blockage occurs, and not output the alert signal when the sensing blockage occurs and the detected target vehicle satisfies the false alert condition.

2. The vehicle alert system of claim 1, wherein the detection sensor comprises an ultrasonic wave sensor, a camera, a lidar, or a radar.

3. The vehicle alert system of claim 2, wherein the detection sensor is further configured to detect the target vehicle based on a reference position angle of the radar.

4. The vehicle alert system of claim 1, wherein the detection sensor is disposed in front or rear of the subject vehicle to detect the target vehicle.

5. The vehicle alert system of claim 1, wherein the false alert condition comprises the position of the target vehicle comprising horizontal and vertical distances between the subject vehicle and the target vehicle, or the lateral error of the target vehicle comprising a lateral distance error, a lateral speed error, and a horizontal time error with respect to the subject vehicle.

6. The vehicle alert system of claim 1, wherein in a state in which the sensing blockage occurs and the target vehicle is approaching the subject vehicle, when the lateral distance error of the target vehicle is less than or equal to a threshold value thereof, and the target vehicle's lateral speed error and time error are greater than or equal to threshold values thereof, the alert determiner is further configured to determine the false alert condition to be satisfied and does not output the alert signal.

7. The vehicle alert system of claim 6, wherein the alert determiner is further configured to output the alert signal when the lateral distance error of the target vehicle exceeds the threshold value.

8. The vehicle alert system of claim 6, wherein the alert determiner is further configured to output the alert signal when the lateral speed error of the target vehicle and lateral time error with respect to the subject vehicle are less than the threshold values.

9. A vehicle alert method comprising:
detecting a target vehicle approaching a subject vehicle;
storing a false alert condition comprising a position of the target vehicle or a lateral error of the target vehicle with respect to the subject vehicle; and
outputting an alert signal when the target vehicle is detected and no sensing blockage occurs, and outputting no alert signal when the sensing blockage occurs and the detected target vehicle satisfies the false alert condition.

10. The vehicle alert method of claim 9, wherein the false alert condition comprises the position of the target vehicle comprising horizontal and vertical distances between the subject vehicle and the target vehicle, or the lateral error of the target vehicle comprising a lateral distance error, a lateral speed error, and a horizontal time error with respect to the subject vehicle.

11. The vehicle alert method of claim 9, wherein in a state in which the sensing blockage occurs and the target vehicle is approaching the subject vehicle, when the lateral distance error of the target vehicle is less than or equal to a threshold value thereof, and the target vehicle's lateral speed error and time error are greater than or equal to threshold values thereof, the false alert condition is determined to be satisfied and the alert signal is not output.

12. The vehicle alert method of claim 11, wherein the alert signal is output when the lateral distance error of the target vehicle exceeds the threshold value.

13. The vehicle alert method of claim 11, wherein the alert signal is output when the target vehicle's lateral speed error and lateral time error with respect to the subject vehicle are less than the threshold values.

14. A vehicle alert system comprising:
a detection sensor configured to detect a target vehicle approaching a subject vehicle;
a storage configured to store a false alert condition comprising a position or lateral error of the target vehicle with respect to the subject vehicle; and
an alert determiner configured to output an alert signal based on a result of a determination of whether the target vehicle is detected, and a sensing blockage occurs.

15. The vehicle alert system of claim 14, wherein the alert signal is output when the target vehicle is detected and the sensing blockage did not occur.

16. The vehicle alert system of claim 14, wherein the alert signal is not output when the sensing blockage occurs and the detected target vehicle satisfies the false alert condition.

\* \* \* \* \*